United States Patent [19]

Larsen et al.

[11] Patent Number: 5,608,797
[45] Date of Patent: Mar. 4, 1997

[54] ON-LINE INDICATOR FOR MULTIPURPOSE HEADSET AMPLIFIER

[75] Inventors: Leo Larsen, Kokkedal; Charles Pedersen, Vekso; Jens Madsen, Jyllinge, all of Denmark

[73] Assignee: GN Netcom A/S, Copenhagen, Denmark

[21] Appl. No.: 332,702

[22] Filed: Nov. 1, 1994

Related U.S. Application Data

[63] Continuation-in-part of Ser. No. 160,590, Dec. 2, 1993, abandoned.

[51] Int. Cl.⁶ .............................. H04M 1/60; H04M 1/22
[52] U.S. Cl. .................... 379/442; 379/396; 379/395; 379/441
[58] Field of Search .................... 379/447, 450, 379/441, 442, 443, 387, 395, 396, 377, 430, 428

[56] References Cited

U.S. PATENT DOCUMENTS

| | | |
|---|---|---|
| 3,951,248 | 4/1976 | Feiner et al. .................. 379/396 X |
| 4,558,178 | 12/1985 | Yasuda et al. .................. 379/430 X |
| 5,058,155 | 10/1991 | Larsen .................. 379/442 |
| 5,210,791 | 5/1993 | Krasik .................. 379/377 |
| 5,359,647 | 10/1994 | Regen et al. .................. 379/377 X |
| 5,422,947 | 6/1995 | Azem .................. 379/396 |

*Primary Examiner*—Ahmad F. Matar
*Assistant Examiner*—T. Devendra Kumar
*Attorney, Agent, or Firm*—Merchant, Gould, Smith, Edell, Welter & Schmidt, P.A.

[57] ABSTRACT

An on-line indicator (40) for the multipurpose headset amplifier comprises a holder in two parts (45) arranged to be snapped onto the ascending, holder (10) which is mounted on the housing (5) of the multipurpose headset amplifier. The on-line indicator has a rotatable indicator or light emitting diode (41) which is coupled to the multipurpose headset amplifier by means of a cable (42). The light diode will light up when the headset is in use to indicate to others that the user of the headset is on the line.

14 Claims, 6 Drawing Sheets

ON-LINE INDICATOR FOR MULTIPURPOSE HEADSET AMPLIFIER

This is a continuation-in-part of U.S. patent application Ser. No. 08/160,590, filed Dec. 2, 1993 now abandoned.

BACKGROUND OF THE INVENTION

The invention relates to an on-line indicator, especially for use in connection with multipurpose headset amplifiers.

A multipurpose headset amplifier is described in detail in the applicants' own U.S. Pat. No. 5,058,155 (herein incorporated by reference). The present invention is a further development of this patent in the form of an on-line indicator arranged to improve the use of a multipurpose headset amplifier, for example of the type described in the above U.S. patent. All that is disclosed in the above U.S. patent is thus included in the present patent application by this reference.

The on-line indicator according to the invention can be sold as optional equipment for a multipurpose headset amplifier in order to improve the use thereof. More specifically, the improvement achieved is that persons who are in the same room as the user of the telephone instrument which is coupled to a multipurpose headset amplifier can visually see that the headset is in use, i.e. that it is coupled to a telephone line. One can thus refrain from addressing the user until the telephone conversation has ended. Such a signalling device is very advantageous in use without in any way disturbing the user or other persons in the same room.

It is a further advantage that the on-line indicator according to the invention can be configured as a unit which can be sold separately and offered to users of multipurpose headset amplifiers as an optional feature.

A light diode used as optical signalling device is an excellent and a sufficient signalling means which results in a modest increase of the power consumption although any other signalling devices including lasers, sound emitting devices etc. are possible.

By configuring the on-line indicator with means for mounting it on an ascending, thready holder it is possible to place the optical signalling device in a spot where other persons will easily notice it.

The on-line indicator according to the invention is preferably configured so that the signalling part, i.e. the part comprising the light diode, can be turned in different directions so that the light can be seen from a direction chosen by the user, for example towards a person working somewhere else in the same room.

Additionally, the invention relates to the necessary means for a multipurpose headset amplifier to be coupled together with an on-line indicator. These means are an on-line indicator port in the form of a connecting jack provided on the multipurpose headset amplifier and possible necessary electrical circuits providing the electrical coupling and the adaptation of the light diode to the audio frequency circuit in the multipurpose headset amplifier. The object of this circuit in the form of an on-line indicator block is also to protect the light diode against a too high signal level and it can moreover be arranged in such a manner that the power consumption is reduced or limited.

The further scope of applicability of the present invention will become apparent from the detailed description given hereinafter. However, it should be understood that the detailed description and specific examples, while indicating a preferred embodiment of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
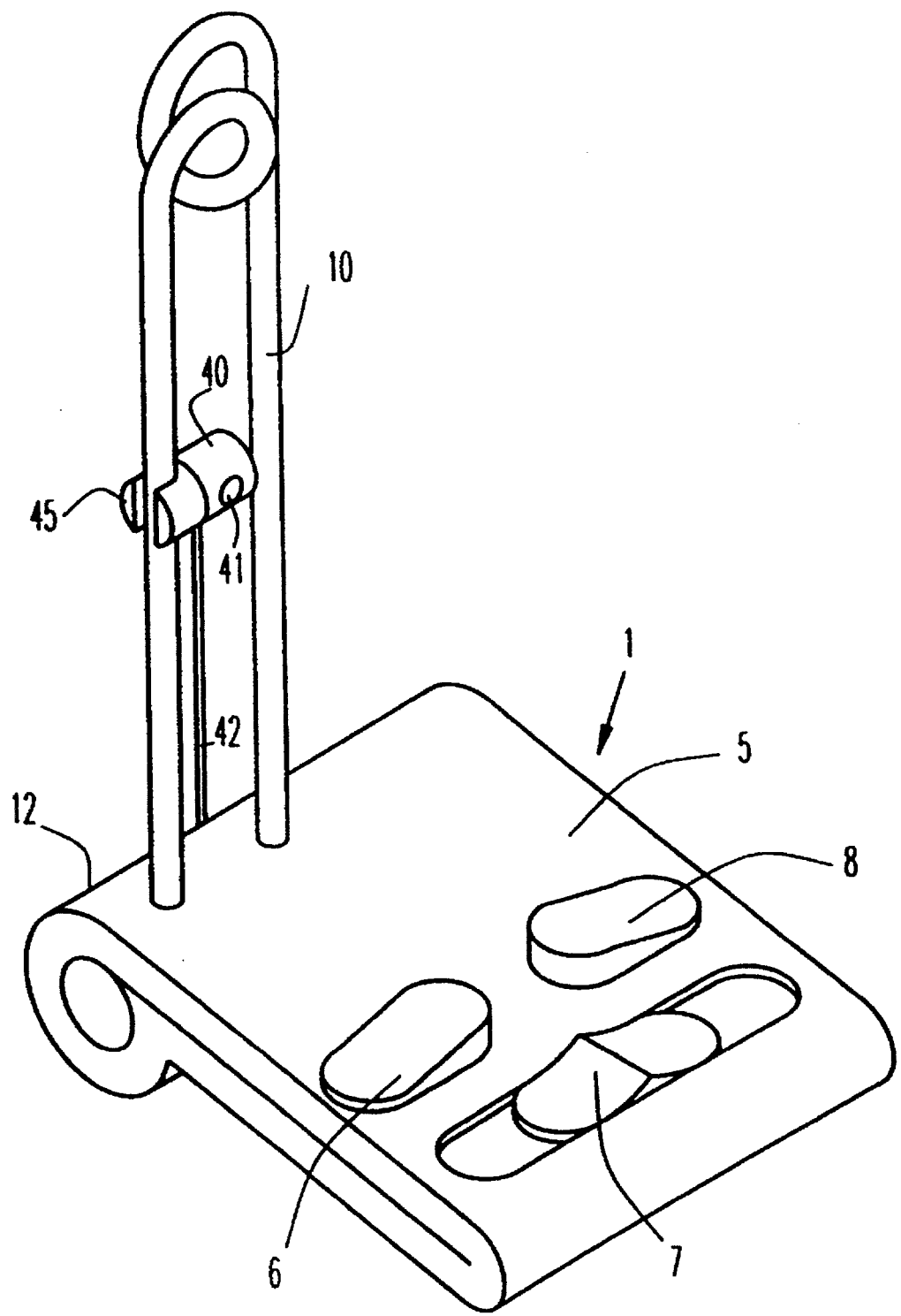
FIG. 1 is an on-line indicator according to the invention coupled to a multipurpose headset amplifier.

FIG. 1 shows a multipurpose headset amplifier 1 comprising a plastic housing 5. On the housing 5 a suspension hoop 10 is mounted for the suspension of a headset when it is not in use. The suspension hoop 10 is configured as an ascending, thready holder. The headset may be of any known type, for example of the type described in U.S. Pat. No. 4,893,344 or U.S. Pat. No. D 311,521, hereby incorporated by reference. The headset is coupled to the amplifier 1 and the amplifier is coupled to a telephone instrument as further described in U.S. Pat. No. 5,058,155 and shall therefore not be mentioned in further detail here.

On the upper side of the housing 5 are placed a waving volume control 7 for the adjustment of the volume in the sound reproducer in the headset, a microphone control 8 for the control of an electric microphone switch and a switch 6 for switching between the headset and the handset.

At the front end of the housing 5 there is a battery chamber 12 for batteries or rechargeable cells. The battery chamber could be replaced by a solar power unit.

As shown, the on-line indicator signalling unit 40 with the preferred light emitting diode 41 and the electric cable 42 coupling the light emitting diode to the amplifier circuit in the multipurpose headset amplifier is mounted on the suspension hoop 10. By means of a holder 45 the on-line indicator 40 is snapped onto the suspension hoop or headset stand 10. The snap-on arrangement comprises small projections 46, see FIG. 6. As the parts 40, 45, 46 are cast in plastic they are slightly elastic so that the on-line indicator 40 can easily be removed from and mounted on the suspension hoop.

Figure 5:
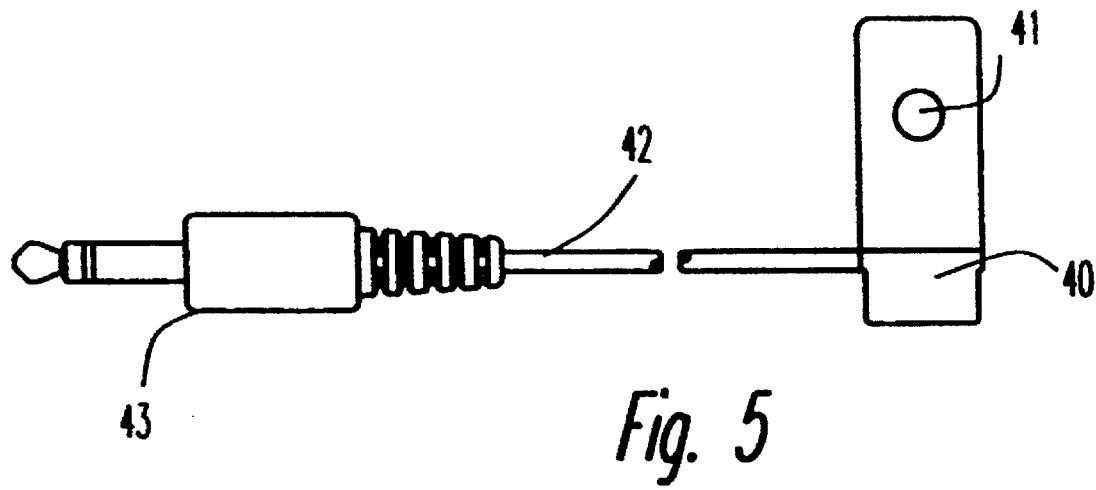
FIG. 5 is the on-line indicator as a complete unit and as an optional feature.
Figure 6:
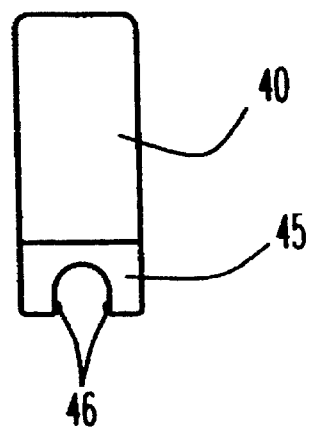
FIG. 6 is a side view of the actual on-line indicator in FIG. 5.
Figure 5A:
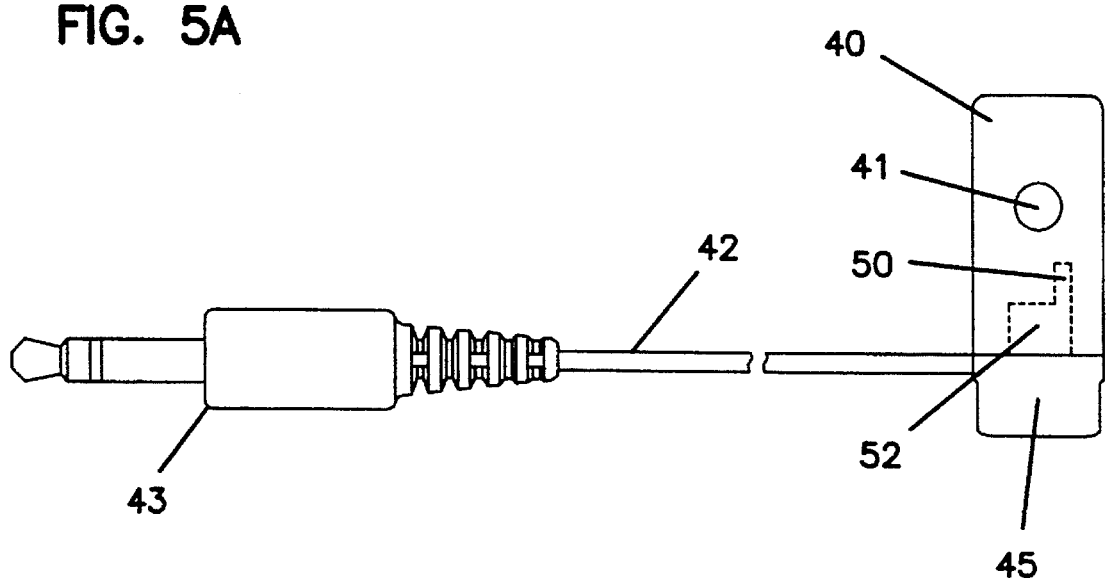
FIG. 5a is a figure like FIG. 5 with portions shown in hidden lines.
Figure 7:
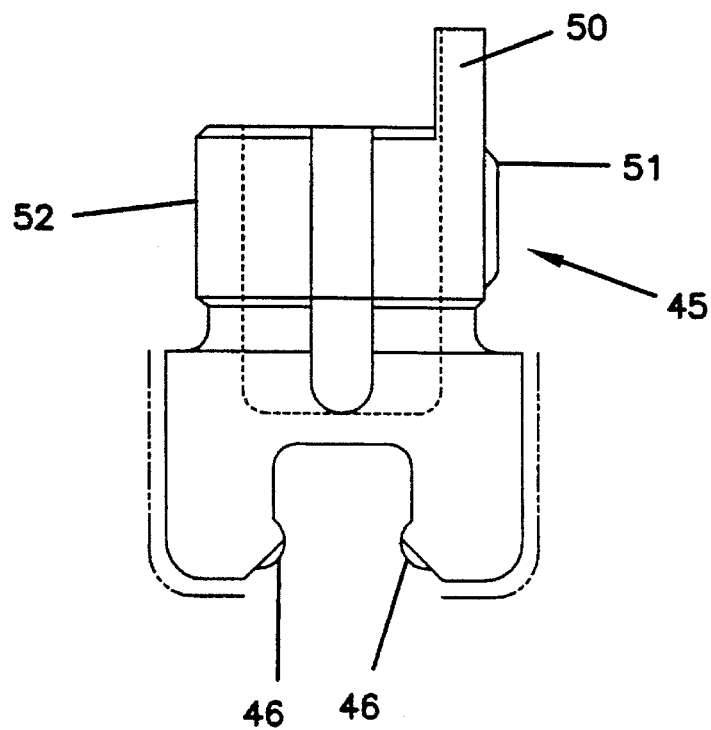
FIG. 7 is a plan view, with portions broken away of element 45.
Figure 8:
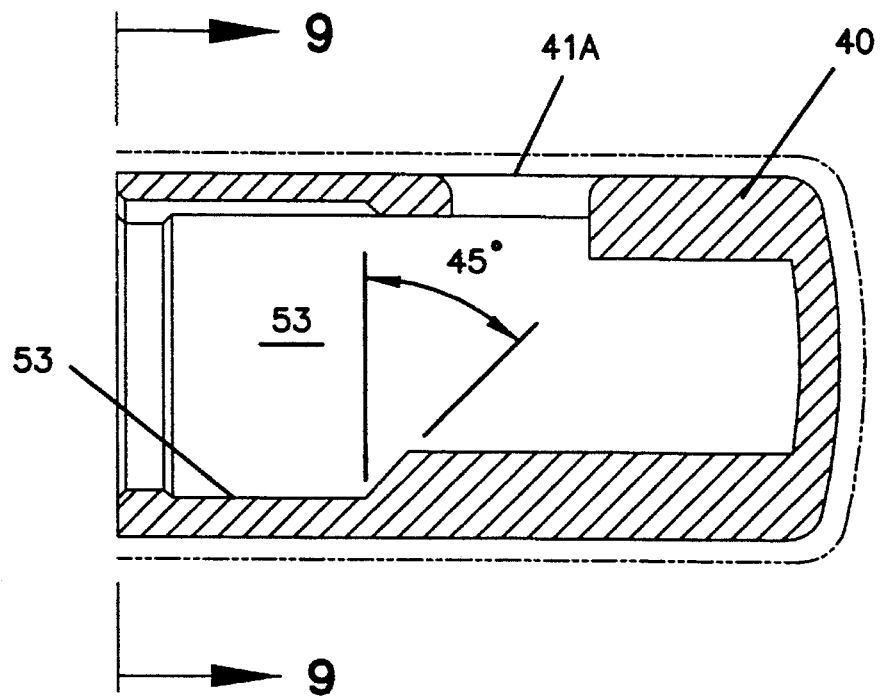
FIG. 8 is a plan view with portions broken away of element 40.
Figure 9:
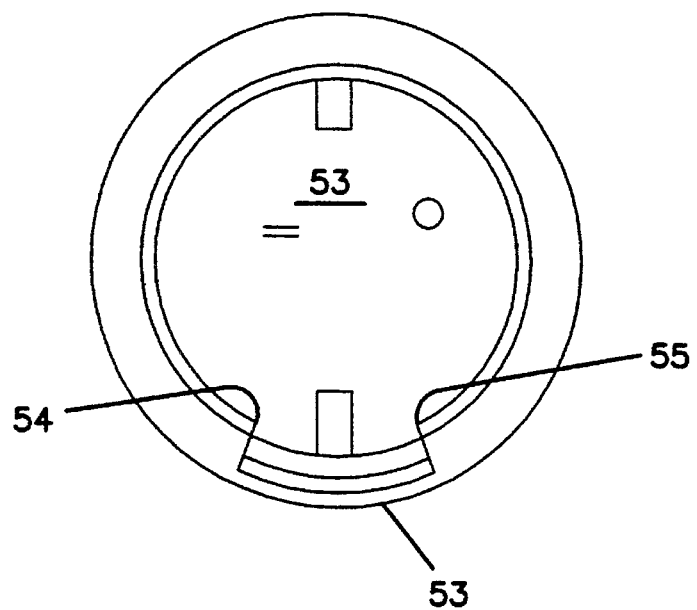
FIG. 9 is an end view taken along lines 8—8 of FIG. 8.

Indicator 40 may be a self-contained unit as shown in FIGS. 5 and 6 or may be integrated into the device in a permanent fashion on hoop 10. Indeed, hoop 10 may be used to supply power to the indicator by various means such as through the core of the hoop or by conductive coatings.

Indicator 40 includes a holder 45 which is affixed with a swivel mount which allows element 40 to be rotated relative to element 45 to adjust for the visibility of diode 41. Likewise, element 45 is designed with small projections 46 so that it will receive a portion of hoop 10 and be retained thereon. The inner diameter of the recess adjacent projections 46 may also be made slightly smaller than the diameter of hoop 10 so that there will be a solid frictional fit even without the projections 46.

Thus by this arrangement, diode 41 can be rotated 360° around a horizontal plane perpendicular to hoop 10 and rotated vertically on the rotational axis between elements 40 and 45 to permit like adjustments.

Diode 41 is preferably a diode with a high concentration lens so as to produce the brightest pinpoint light source possible at the lowest energy consumption. Alternative indicators are also possible.

The swivel construction shown in FIGS. 5a and 7-9 between elements 40 and 45 include a pin 50 extending from a peripheral edge 51 of cylinder 52. The pin is received within cavity 53 of element 40.

In the preferred embodiment, the maximum swivel capability between elements 40 and 45 is set at 20 degrees either side of a center point (i.e., 40 degrees total) although this can certainly be extended if desired. To limit the rotational range of elements 45 relative to element 40 pin 50 is permitted to turn within slot 53 (see FIGS. 8 and 9) but is limited by the sidewalls 54, 55. The aperture for LED 41 can be seen at aperture 41a in FIG. 8.

Alternate means can be provided to accomplish this swivel feature, as well.

In an alternate embodiment, the indicator unit 40 may be provided with other fixture means such as a tie clasp or hair pin to affix to the wearer's clothing or hair.

Figure 4:
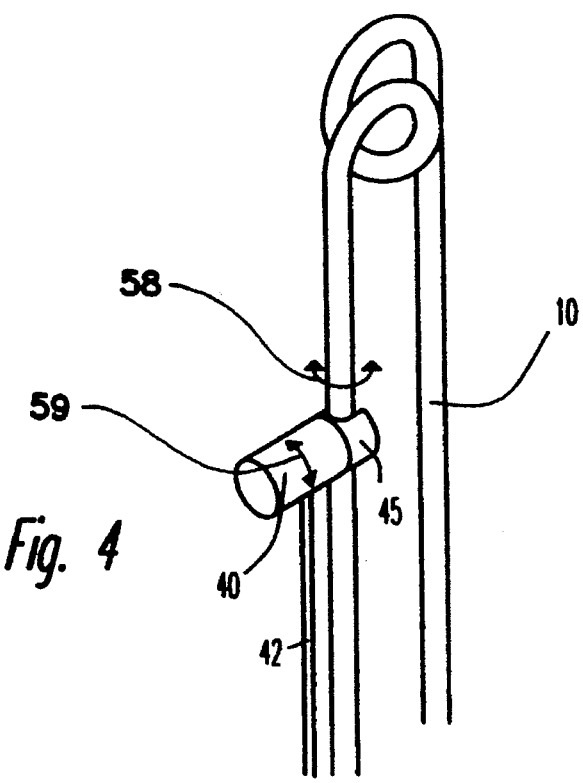
FIG. 4 is the on-line indicator on the ascending, thready holder.

FIG. 4 shows the on-line indicator on a slightly larger scale than FIG. 1. The arrows 58, 59 show how the on-line indicator 40 can be turned partly in relation to the holder 45 and partly as a unit around the longitudinal axis of the suspension hoop 10. This provides the possibility of turning the light emitting diode 41 in any desired direction.

Figure 3:
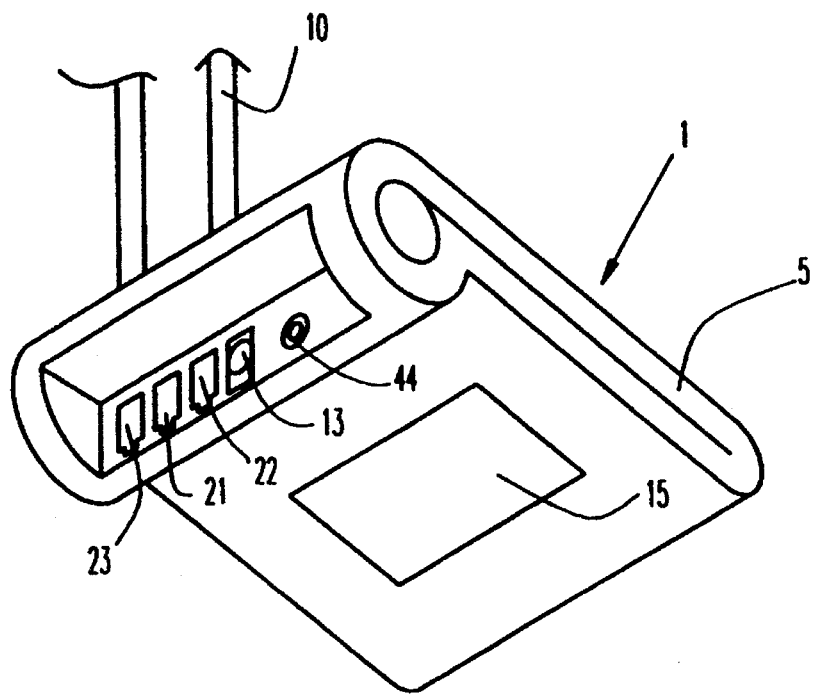
FIG. 3 is the multipurpose headset amplifier seen from below.

FIG. 3 shows the same as FIG. 1, but seen from the underside of the multipurpose headset amplifier. On the underside there is a cover 15 for the control unit which is explained in detail in U.S. Pat. No. 5,058,155. In addition to this FIG. 3 shows a modular jack 21 for the handset, a modular jack 22 for the coupling of a telephone instrument, a modular jack 23 for the coupling of the headset (not shown) and a jack 13 for external power, if necessary. FIG. 3 finally shows the on-line indicator port 44 for the coupling of the cable 42 from the on-line indicator 40, 41. The coupling is effected by means of an on-line indicator plug 43, see FIG. 5. Additionally, FIG. 5 shows the on-line indicator as a unit, i.e. as an optional feature capable of being coupled to any multipurpose headset amplifier having or being provided with an on-line indicator port.

Figure 2:
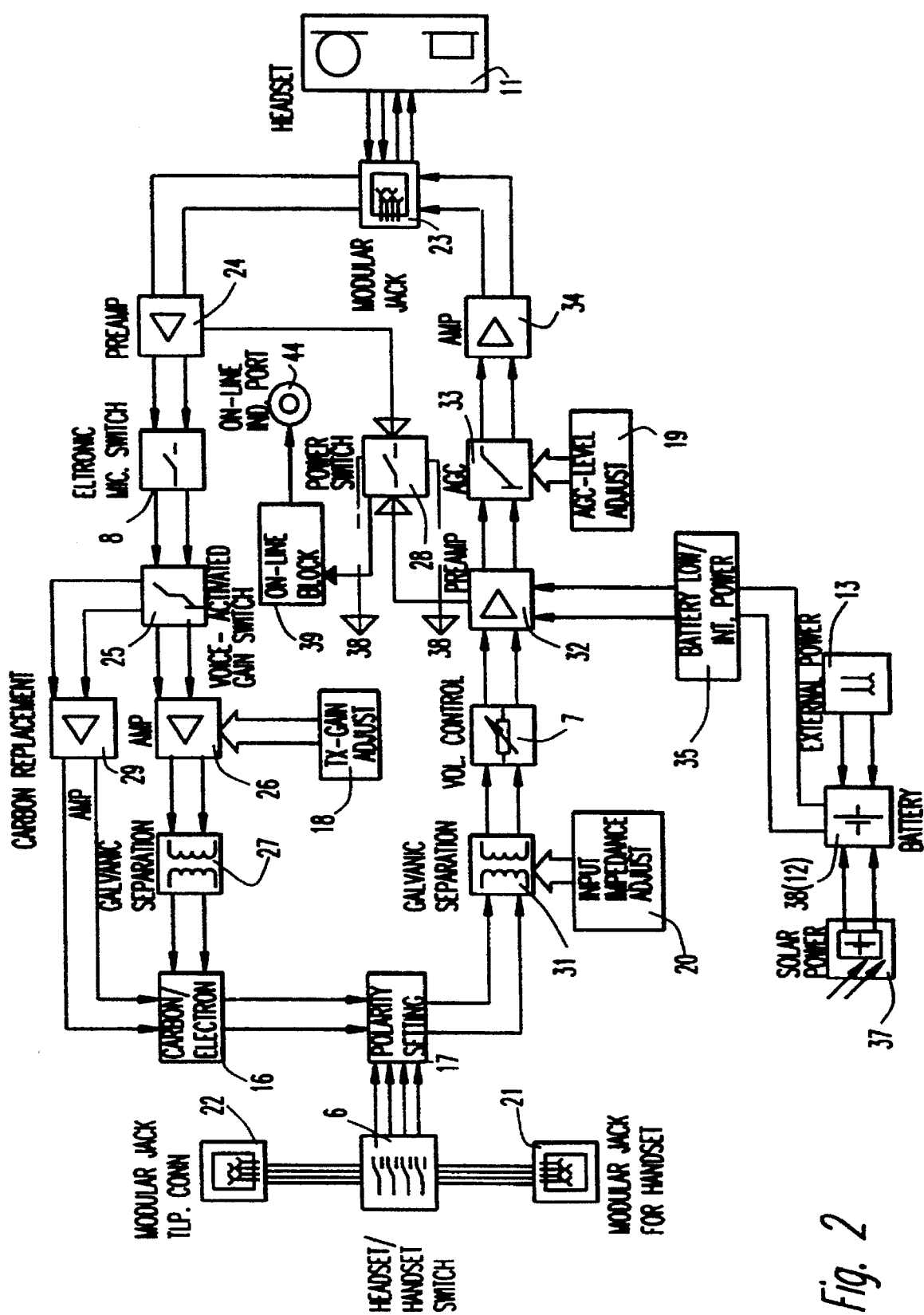
FIG. 2 is a block diagram showing the multipurpose headset amplifier's electronic circuit in full, the connection to a telephone instrument, a handset and a headset and the on-line indicator port with the on-line block.

In the following, FIG. 2 of the drawing will be explained. FIG. 2 is a block diagram showing the multipurpose headset amplifier's electronic circuit in full, the connection to a telephone instrument, a handset and a headset and the on-line indicator port 44 which is coupled to the multipurpose headset amplifier via the on-line block 39. The circuit shown in FIG. 2, except the on-line indicator port 44 and the on-line indicator block 39, is identical with the circuit shown in U.S. Pat. No. 5,058,155 owned by the applicant in the present application and will therefore not be described in further detail here.

The on-line indicator port 44 which is also shown in FIG. 3 consists of a standard female plug arranged to receive the male on-line indicator plug 43. As the shown embodiment which is the preferred embodiment uses a light diode 41, it is sufficient that the cable 42 comprises two conductors and that the two plugs are arranged for two connections only. Any number of indicators may be employed subject to power consumption restraints. The light emitting diode 41 can for example be made by the Stanley Electric Company, Type KR3301X, which is light emitting diode emitting a red colour and at the front is provided with a water clear lens. This light emitting diode has a wavelength of 660 nm and a light intensity from 70 mcd to typically 140 mcd. Light emitting diodes of this type light up already have a power consumption field of 0.5 ma and have a power consumption field in the order of 0.5 to 2.5 ma. Thus, the power consumption is modest and will only to a limited extent influence the life of the battery in the multipurpose headset amplifier. FIG. 2 shows that the coupling via the on-line indicator block 39 is made to the power switch circuit 28, which is coupled to the pre-amplifier 32. In the preferred embodiment with a light emitting diode 41 the on-line block 39 comprises only a single transistor ensuring correct adaptation of the light emitting diode 41 to the amplifier circuit. Naturally, the extent of the on-line block 39 depends on the type of light source 41 used, but it will be obvious to a person skilled in the art to make such an adaptation. With this coupling of the on-line indicator it is ensured that the on-line indicator lights up only when the headset is in use to indicate to co-workers that the user is on the line. This ensures minimum power consumption. The coupling can be configured in such a manner that the on-line indicator 41 flashes concurrently with the sound signal so that the effect of the signals is increased. The light emitting diode 41 can be fed directly with power by means of the electric audio signal in the multipurpose headset amplifier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A multipurpose headset amplifier comprising an amplifier circuit, jacks for connecting the amplifier to a headset and a telephone instrument, and a housing, the amplifier further comprising:

a rod-like member extending from the housing;

an on-line indicator including a holder and optical signaling device having at least one light emitting diode within the holder, the holder including means for attaching the holder to the rod-like member; and means for electrically connecting the on-line indicator the amplifier circuit.

2. The multipurpose headset amplifier of claim 1, wherein the means for attaching a holder to the rod like member includes means for rotatably mounting the holder to the rod-like member, the holder further comprising at least two parts being rotatable in relation to each other.

3. The headset amplifier according to claim 1, wherein the electrically connecting means includes a cable and a jackplug on the cable.

4. A multipurpose headset amplifier comprising an amplifier circuit, jacks for connecting the amplifier to a headset and a telephone instrument, and a housing, the amplifier further comprising:

an on-line indicator removably attachable with the housing for electrically coupling with the amplifier circuit, the on-line indicator being unitary and including an optical signaling device in electrical communication with a cable in electrical communication with a plug portion, the plug portion adapted for receipt in the housing to electrically couple the optical signaling device with the amplifier circuit.

5. A multipurpose headset amplifier in electrical communication with a removably attachable on-line indicator, the headset amplifier comprising:

an amplifier circuit including an audio frequency portion, an on-line indicator port and an on-line indicator block, all in electrical communication, the on-line indicator block having means for electrically coupling the audio frequency portion to the on-line indicator;

jacks for connecting the amplifier to a headset and a telephone instrument; and a housing;

the on-line indicator being a unitary member comprising: an optical signaling device in electrical communication with a cable in electrical communication with a plug portion, the plug portion adapted for receipt in the housing to electrically couple the optical signaling device with the headset amplifier.

6. An on-line indicator for a multipurpose headset amplifier, the amplifier having an attachment point thereon for the indicator, the indicator comprising a signaling unit for electrically coupling to said amplifier, said signaling unit including a housing having means for removably attaching to said attachment point on said amplifier, said housing being adjustable with respect to said attachment point, whereby the signaling unit may be oriented in any direction.

7. The on-line indicator according to claim 6, wherein said housing includes at least a first component and a second component, said first component including means for rotatably coupling said housing to said amplifier, and said second component including means for rotatably coupling said second component relative to said first component.

8. The on-line indicator according to claim 7, wherein said first component means additionally includes a pair of projections spaced a predetermined distance apart, said predetermined distance being equal to or less than a diameter on said attachment point.

9. The on-line indicator according to claim 7, wherein said second component includes a light emitting diode.

10. The on-line indicator according to claim 7, wherein said first component and second component are rotatable in planes orthogonal to each other.

11. The on-line indicator according to claim 10, wherein said first component means additionally includes a recess that defines two opposing walls, said walls including opposing projections, the distance between said opposing projections being less than the thickness of said attachment point.

12. The on-line indicator according to claim 10, wherein said first component means includes a recess and wherein second component means includes a limiting recess and additionally includes a pin devised to be received within said limiting recess whereby said first and second components may be rotated relative to each other within the limits of the limiting recess.

13. The on-line indicator according to claim 12, wherein said limiting recess has an angular rotation of approximately 40 degrees.

14. The on-line indicator according to claim 10, wherein said first component means additionally includes a cavity and wherein a portion of said cavity is further defined by a limiting recess, and said second component means includes a barrel sized to be received within said cavity of said first component means and a pin sized to be received within said limiting recess, whereby the rotation of the two components relative to each other is limited by extent of the limiting recess.

\* \* \* \* \*